Mar. 27, 1923.

L. M. WOOLSON.
ELECTRICAL APPARATUS FOR MOTOR VEHICLES.
FILED JULY 10, 1918.

1,449,800.

2 SHEETS—SHEET 1.

INVENTOR
BY
ATTORNEYS

Patented Mar. 27, 1923.

1,449,800

UNITED STATES PATENT OFFICE.

LIONEL M. WOOLSON, OF DAYTON, OHIO, ASSIGNOR, BY MESNE ASSIGNMENTS, TO BIJUR MOTOR APPLIANCE COMPANY, A CORPORATION OF DELAWARE.

ELECTRICAL APPARATUS FOR MOTOR VEHICLES.

Application filed July 10, 1918. Serial No. 244,172.

*To all whom it may concern:*

Be it known that I, LIONEL M. WOOLSON, a citizen of the United States, and a resident of the city of Dayton, in the county of Montgomery and State of Ohio, have invented an Improvement in Electrical Apparatus for Motor Vehicles, of which the following is a specification.

This invention relates to accessories for internal combustion engines and with regard to its more specific features to the correlation of electric apparatus with the engine.

One of the objects of this invention, is to provide apparatus of the above type of simple construction in which the parts are compactly disposed and securely held in position.

Another object is to provide apparatus of the above type in which the parts may be readily and conveniently assembled in exact position for effective action.

Another object is to provide for electric generators for motor vehicles, a practical and inexpensive mounting of few parts and efficient action.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
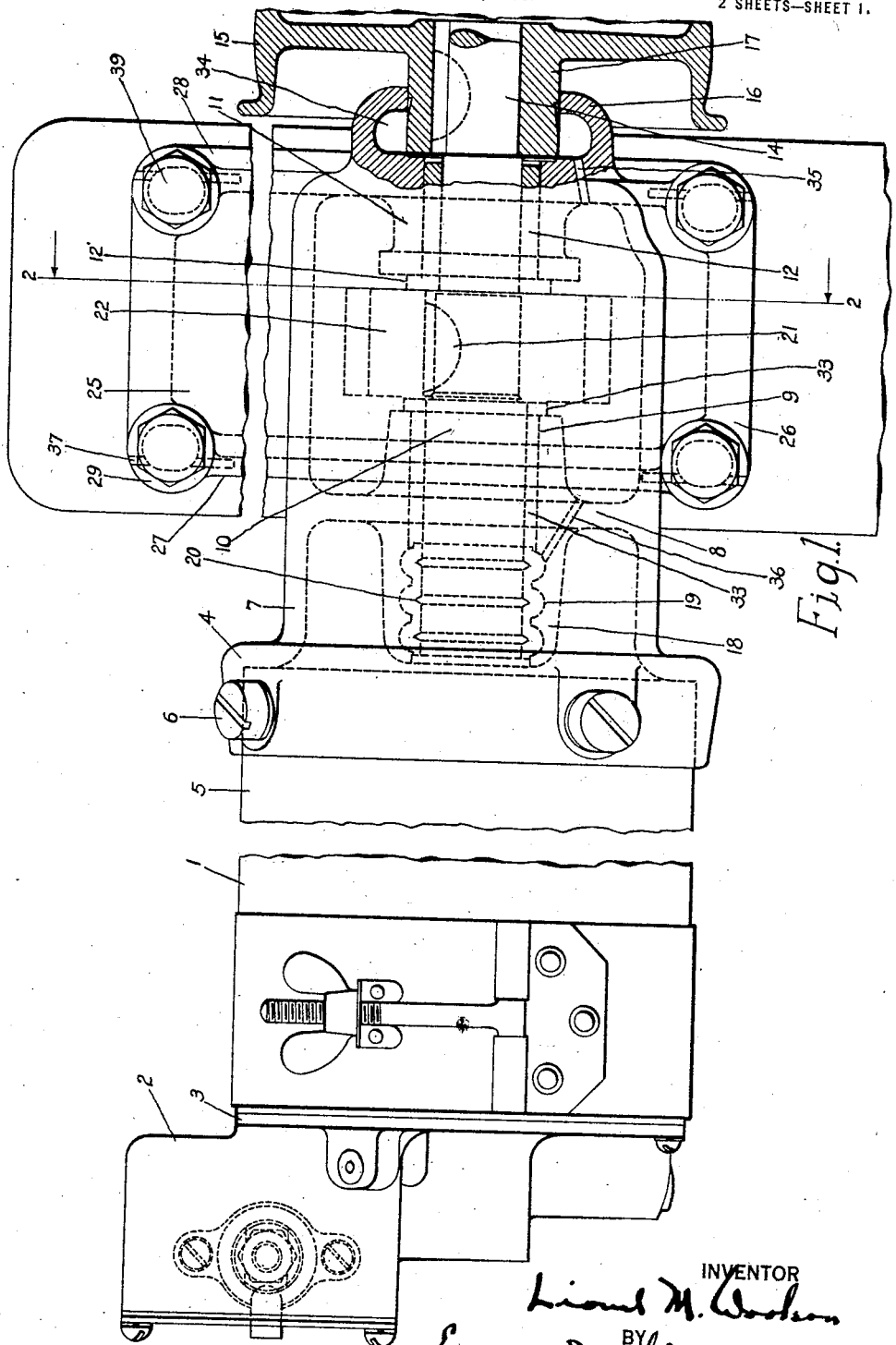
Figure 2:
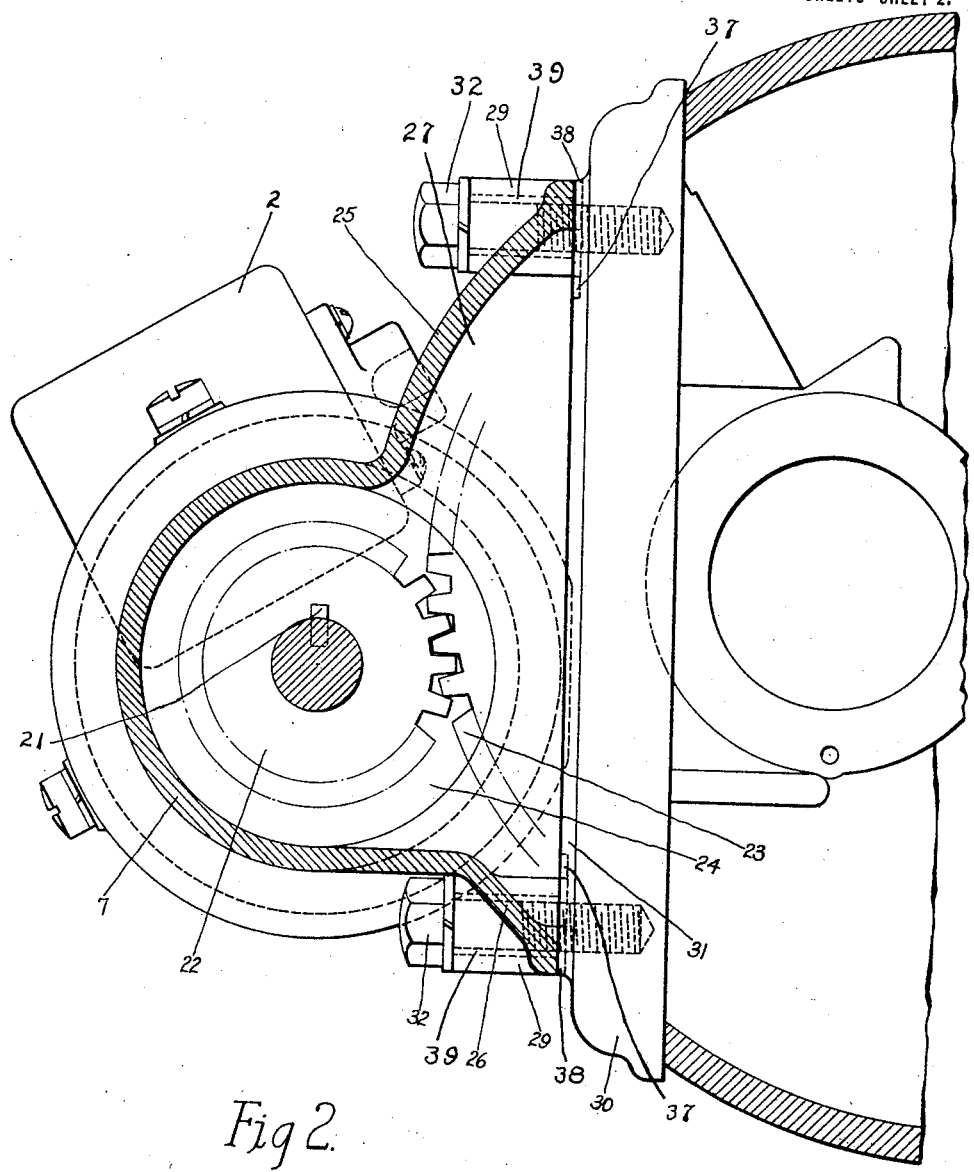

In the accompanying drawings wherein is shown one of various possible embodiments of the several features of this invention, Fig. 1 is a side view partly in longitudinal section. Fig. 2 is a view similar to Fig. 1 in transverse section along the line 2—2 of Fig. 1.

Similar reference characters refer to similar parts throughout the different views of the drawings.

My present invention embodies a special development of principles disclosed and claimed in the patents of Joseph Bijur Nos. 1,362,770 and 1,362,771, dated December 21, 1920.

Referring now to Fig. 1 of these drawings, there is shown a generator 1 of any type applicable to motor vehicles, which generator may be supplied with any desired type of regulating means (not shown), this generator performing preferably among others the function of keeping a storage battery (not shown) in charged condition. The generator is preferably provided with an automatic electro-magnetic switch (not shown) enclosed in a housing 2, formed on end-head 3 for the purpose of preventing the battery from discharging through the generator. The regulating means and the electro-magnetic switch need not be described in detail as these features constitute no part of my present invention.

The opposite end-head 4 of generator 1 is preferably telescoped over the yoke 5 and secured thereto by bolts 6. The end-head 4 is preferably made of a casting of special form, and performs not only the function of an end-head for the dynamo, but also constitutes a means for supporting the dynamo upon the engine and a means for inclosing the driving transmission between the dynamo and the engine. It may be noted that the end heads of a dynamo are those elements thereof that lodge, support or carry the armature or rotor bearings.

Referring to Figs. 1 and 2, it is noted that end-head 4 is formed with a reduced integral cylindrical extension 7, which extension is formed at an intermediate portion with an integral internal flange 8, formed as an integral part with a bearing supporting portion 9 for armature shaft 10. Within said portion 9 there is a bearing 33 for shaft 10 preferably provided with an integral flange $33^1$ to prevent movement of the bearing toward the generator. The free end of the housing extension 7 is cast with an inturned bearing-supporting portion 11 as shown in Fig. 1, within which rests the bearing 12 formed with an integral flange $12^1$ to prevent it from moving in a direction away from the generator. Shaft 10 extends through bearing 12, as shown in the drawing, and has keyed to its free end 14 a pulley 15, only a fragment of which is shown, which pulley may be employed for driving a fan or the like. Extending from the outside of the radially extending part of bearing-supporting portion 11 there is an integral flange 16 whose cross section is curved so that its edge rests against an intermediate part of hub 17 of pulley 15, forming an oil-well 34, a duct 35 connecting said well with the gear housing.

The bearing-supporting portion 9 is preferably also formed with an integral extension 18 extending on the side of flange 8 opposite to bearing-supporting portion 9. This extension has a succession of troughs 19, each of which cooperates with one of a plurality of centrifugal oil-thrower members 20 formed preferably as integral portions of shaft 10 and serving to prevent the entry of lubricant from the transmission to the armature of the machine. The action of centrifugal oil-throwers is well-known, and as the specific construction of the oil-thrower is no part of my present invention, it need not be more fully set forth. A duct 36 compels the flow of excess oil to the interior of the gear housing.

Keyed, as at 21, to that portion of shaft 10 extending between bearing flanges $12^1$ and $33^1$ and in close proximity to said bearings, there is preferably a power transmitting gear 22 adapted to cooperate with a gear 23 preferably forming a part of the engine construction, such as the timer gear shown in Fig. 2.

To maintain these gears in cooperation and at the same time to support the dynamo in firm relation to the engine, I fashion the extension 7 of end-head 4 in the form of a bracket. One side of extension 7 is open, as shown at 24, along a length of the extension, approximately the width of the housing enclosing the timer gear and along a portion corresponding to the gear 22. Projecting from opposite sides of extension 7 at the edges of the opening there are bracket arms 25 and 26. These bracket arms, as shown, are preferably cast integral with the end-head and are preferably curved concentrically with the timer gear 23. The arms 25 and 26 are bounded by integral plane lateral walls extending perpendicular to the shaft of the armature, as shown at 27 and 28, and continuous with the cylindrical extension 7. The free edges of arms 25 and 26 and walls 27 and 28 form a rectangle parallel to the shaft of the dynamo or perpendicular to the end-head portion 4. Each of the arms 25 and 26 is preferably formed at its junction with bounding walls 27 and 28 with integral lugs 29, there being thus preferably four such lugs, as shown in the drawing. The timer gear housing 30 is preferably cut away on a plane at right angles to the gear as shown at 31 to expose a segment of said gear, the cut edge constituting a rectangle geometrically substantially identical with the rectangular edge formed by arms 25 and 26 and walls 27 and 28. The parts are so designed that when the rectangular surface associated with the generator is superposed in registry with the rectangular edge on the timer gear housing, gear 22 and 23 will be in proper cooperation. Bolts 32 passing through lugs 29, extend into the timer gear housing and serve to firmly secure the dynamo and all its accessory parts, shown in Fig. 1, to the engine.

It is noted in Fig. 2 that the line joining the center of the timer gear with that of gear 22 is not horizontal. This angle has no material bearing on the operation of the construction but is merely indicated to show the possibility of choice of position for the dynamo and its accessory parts, rendering it possible to avoid interference with adjoining parts of the engine. It is of course obvious that the construction may be formed with the line of centers, above discussed, in horizontal position or sloping upwards from the timer gear center, or in any of a great variety of possible positions, it being possible to readily design arms 25 and 26 to place this line of centers at any desired and practicable angle, with a view generally to avoiding obstruction of adjacent parts. It is, however, to be understood that there are particularly beneficial features inherent in the specific construction shown and described.

To assure accurate registry of the gears, and to accurately position the armature shaft in parallelism to the cam shaft, I preferably provide cooperating ridges and grooves at the meeting surface of arms 25 and 26 and the free edge 31 of the timer gear housing. Having reference to the drawings I have shown such elements at 37—38, there being preferably a ridge 38 on the lower surface of each of the lugs 29, and a corresponding groove 37 in the free edge of the timer gear housing, such groove being of somewhat greater length than the ridge 38 as shown. It is of course understood that such cooperating ridge and groove may be provided at one or more points, the preferred form being that shown in the drawings where cooperating ridges and grooves are shown at each of the four lugs 29.

By this arrangement I readily secure accurate cooperation between the gears by simply fitting the generator into cooperation with the timer gear housing and then by slight adjustment, moving the device along the track provided by cooperating ridges 38 and grooves 37 until the gears have the correct location relative to each other. It is noted that the openings for bolts 32 in lugs 29 are somewhat elongated, as shown at 39, to render possible the small degree of adjustments above described, bolts 32 when tightened firmly holding the generator unit in the position in which it is adjusted. It is also clear that this arrangement makes possible slight re-adjustments of the device after a period of use, to take up any wear on the gear teeth.

The operation of my construction is clear from an inspection of the drawings. It may simply be noted that when the engine is in operation and timer gear 23 is rotating, it will in turn cause a rotation of gear 22 and of the associated armature of the dynamo, which dynamo then performs the usual electrical functions. Pulley 15 rotating with gear 22 will drive the fan or other accessory with which it may be connected. Wobbling of gear 22 is effectively prevented by flanges 12′ and 33′ of the bearings.

Although I have shown my invention applied to a timer gear, it is to be understood that I may employ any other rotatable part of the engine for the purpose of effecting a transmission between the engine and the dynamo. It is also to be understood that although I have shown my invention applied to a generator, it may be employed to good advantage in connection with a starting motor or other machine, but there are particular benefits to be derived from the use of the specific construction shown and described.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In apparatus of the character described, in combination, an engine, a dynamo, a combined end head and mount for said dynamo, said mount supporting said dynamo from said engine, in a plane substantially parallel to the axis of said dynamo, and means for permitting adjustment of the position of said dynamo by shifting said mount in one direction within its plane for lateral displacement of said axis.

2. In apparatus of the character described, in combination, an engine, a power transmitting member connected thereto, a dynamo, a cooperating power transmitting member connected thereto, a combined mount for said generator and housing for said second power transmitting member, said combined member supporting said dynamo by being secured to a part of said engine at substantially right angles to said transmission, and a guide along which said mount may be moved within its plane for small adjustment of said second power transmitting member, to effect proper cooperation of the parts.

In testimony whereof, I have signed my name to this specification this tenth day of June, 1918.

LIONEL M. WOOLSON.